(12) United States Patent
Martin et al.

(10) Patent No.: US 12,249,006 B2
(45) Date of Patent: *Mar. 11, 2025

(54) SYSTEMS AND METHODS FOR RECOLOURING VECTOR GRAPHICS

(71) Applicant: Canva Pty Ltd, Surry Hills (AU)

(72) Inventors: Tristan Lindsay Martin, Surry Hills (AU); Sebastian Arthur Chua, Maroubra (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,028

(22) Filed: Oct. 9, 2023

(65) Prior Publication Data

US 2024/0046531 A1 Feb. 8, 2024

Related U.S. Application Data

(63) Continuation of application No. 17/357,931, filed on Jun. 24, 2021, now Pat. No. 11,816,761.

(30) Foreign Application Priority Data

Jun. 29, 2020 (AU) .............................. 2020902170

(51) Int. Cl.
 *G06T 11/00* (2006.01)
(52) U.S. Cl.
 CPC ................... *G06T 11/001* (2013.01)
(58) Field of Classification Search
 None
 See application file for complete search history.

(56) References Cited

U.S. PATENT DOCUMENTS

| | | |
|---|---|---|
| 5,909,220 A | 6/1999 | Sandow |
| 2014/0071347 A1 | 3/2014 | Chen et al. |
| 2015/0170380 A1 | 6/2015 | Duwenhorst |
| 2015/0242099 A1 | 8/2015 | Wallace et al. |
| 2019/0355154 A1* | 11/2019 | Batra ................. G06T 9/00 |
| 2019/0378249 A1 | 12/2019 | Rathore et al. |
| 2020/0160567 A1 | 5/2020 | Vallespi |
| 2021/0042965 A1 | 2/2021 | Phogat et al. |

OTHER PUBLICATIONS

EP 21182019, Extended EP Search Report mailed Nov. 25, 2021, pp. 1-12.
Huiwen Chang et al., Palette-based Photo Recoloring, ACM Transactions on Graphics (Proc. SIGGRAPH), 34(4), Jul. 2015, pp. 1-11.
Zhang Qing et al: "Palette-Based Image Recoloring Using Color Decomposition Optimization", IEEE Transactions On Image Processing, IEEE, USA, vol. 26, No. 4, Apr. 1, 2017 (Apr. 1, 2017), pp. 1952-1964.

* cited by examiner

*Primary Examiner* — Sarah Le
(74) *Attorney, Agent, or Firm* — GrowIP Law Group LLC (57) ABSTRACT

Described herein is a computer implemented method for recolouring a vector graphic. Dominant colours defined by the vector graphic are determined, and a set of file colour groups is generated by associating file colours with dominant colours defined by the vector graphic. Colour change input data defining a particular file colour group and a new colour is received, and in response a colour transformation is determined. Corresponding transformed file colours are then calculated using the colour transformation.

20 Claims, 7 Drawing Sheets

SYSTEMS AND METHODS FOR RECOLOURING VECTOR GRAPHICS

CROSS-REFERENCE TO RELATED APPLICATIONS

This application is a U.S. Continuation application that claims priority to U.S. Non-Provisional application Ser. No. 17/357,931, filed Jun. 24, 2021, that claims the benefit of the filing date of Australian Patent Application No. 2020902170, filed Jun. 29, 2020, which are each hereby incorporated by reference in their entirety.

FIELD

The present disclosure is directed to systems and methods for recolouring vector graphics.

BACKGROUND

Various computer implemented tools for creating and publishing designs or other visual content exist. Many such tools make use of vector graphics.

Once a vector graphic has been created or added to a design, users will often want to recolour the graphic.

In some cases, recolouring is a relatively simple task. Consider, for example, a simple line drawing of rectangle. In this case, recolouring may simply involve changing a single existing line colour (e.g. black) to a single new line colour (e.g. red).

In many cases, however, recolouring is far more complex—for example recolouring a graphic that has hundreds (or even more) colours.

Background information described in this specification is background information known to the inventors. Reference to this information as background information is not an acknowledgment or suggestion that this background information is prior art or is common general knowledge to a person of ordinary skill in the art.

SUMMARY

Described herein is a computer implemented method for recolouring a vector graphic, the method comprising: processing, by a processing unit, the vector graphic to determine a set of file colours, each file colour in the set of file colours being a colour defined by the vector graphic; processing the vector graphic to determine a plurality of dominant colours defined by the vector graphic; generating a set of file colour groups by associating each file colour in the set of file colours with a file colour group, each file colour group being associated with a dominant colour defined by the vector graphic; receiving, via an input device, colour change input data defining a particular file colour group and a new colour; and in response to receiving the colour change input data: determining a colour transformation describing a change to the new colour; for each file colour associated with the particular file colour group, calculating a corresponding transformed file colour using the colour transformation; recolouring the vector graphic by replacing each file colour associated with the particular file colour group with its corresponding transformed file colour; and displaying, on a display, the recoloured vector graphic.

Also described herein is a computer processing system comprising: a processing unit; an input device; a display; and a non-transient computer-readable storage medium storing instructions, which when executed by the processing unit, cause the processing unit to: process a vector graphic to determine a set of file colours, each file colour in the set of file colours being a colour defined by the vector graphic; process the vector graphic to determine a plurality of dominant colours defined by the vector graphic; generate a set of file colour groups by associating each file colour in the set of file colours with a file colour group, each file colour group being associated with a dominant colour defined by the vector graphic; receive, via the input device, colour change input data defining a particular file colour group and a new colour; and in response to receiving the colour change input data: determine a colour transformation describing a change to the new colour; for each file colour associated with the particular file colour group, calculate a corresponding transformed file colour using the colour transformation; recolour the vector graphic by replacing each file colour associated with the particular file colour group with its corresponding transformed file colour; and display, on the display, the recoloured vector graphic.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

As described above, many tools for creating and publishing visual content make use of vector graphic formatted images (vector graphics for short). The present disclosure provides systems and methods for recolouring vector graphics.

One example of vector graphic format is the scalable vector graphic (SVG) format developed by the World Wide Web Consortium. In order to illustrate the techniques and operations of the present disclosure examples are provided with reference to the SVG format. The features of the present disclosure can, however, be used (or adapted for use) with alternative vector graphic formats (e.g. EPS, PDF, AI, or other vector graphic formats), and/or raster images (by accessing a colour table associated therewith). The features of the present disclosure can also be used (or adapted for use) with multiple images—e.g. across a corpus of images that make up a brand identity or are otherwise related.

Initially, a networked environment and computer processing system in which features of the present disclosure can be implemented will be described. Following this, one example of a user interface for creating a design with one or more vector graphics and recolouring such vector graphics is described. Processing performed to recolour a given vector graphic is then described.

Figure 1:
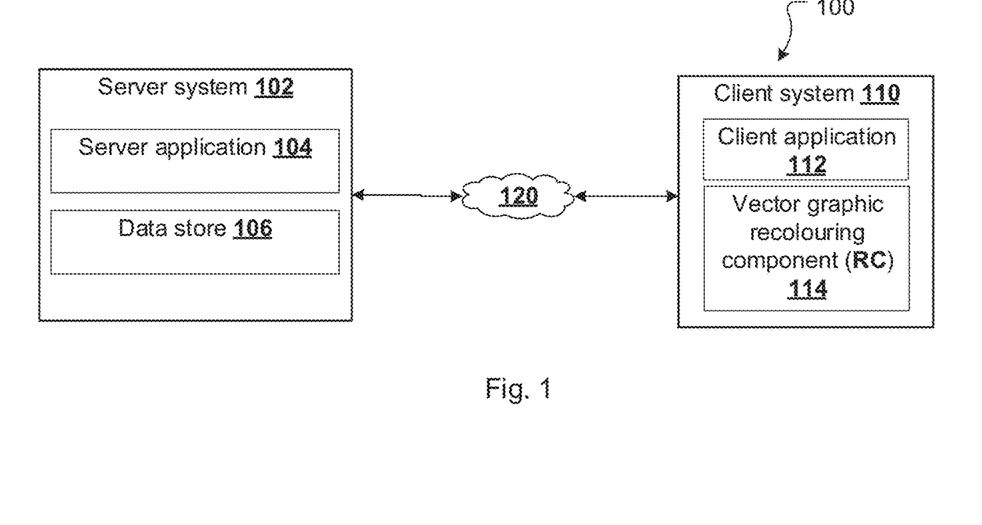
FIG. 1 is a block diagram illustrating an example environment in which features of the present disclosure can be implemented.

By way of example, FIG. 1 depicts a networked environment 100 in which the various operations and techniques described herein can be performed.

Networked environment 100 includes a server system 102 and a client system 110 that are interconnected via a communications network 120 (e.g. the Internet). While a single client system 110 is illustrated and described, server system 102 will typically serve multiple client systems.

The server system 102 includes various functional components which operate together to provide server side functionality.

One component of server system 102 is a front-end server application 104. The server application 104 is executed by a computer processing system to configure the server system 102 to provide server-side functionality to one or more corresponding client applications (e.g. client application 112 described below). The server-side functionality includes operations such as user account management, login, and content creation functions—for example creating, saving, publishing, sharing content.

To provide the server-side functionality, the server application 104 comprises one or more application programs, libraries, APIs or other software elements. For example, where the client application 112 is a web browser, the server application 104 will be a web server such as Apache, IIS, nginx, GWS, or an alternative web server. Where the client application 112 is a specific application, the server application 104 will be an application server configured specifically to interact with that client application 112. Server system 102 may be provided with both web server and application server modules.

In the present example, server system 102 also includes a data store 106 which is used to store various data required by the server system 102 in the course of its operations. Such data may include, for example, user account data, design template data, design element data, and data in respect of designs that have been created by users. While one data store 106 is depicted, server system 102 may include/make use of multiple separate data stores—e.g. a user data store (storing user account details), one or more design element library data stores (storing design elements such as graphics that users can add to designs being created); a template data store (storing templates that users can use to create designs); a design data store (storing data in respect of designs that have been created); and/or other data stores.

In order to provide server side functionality to clients, server system 102 will typically include additional functional components to those illustrated and described. As one example, server system 102 will typically include one or more firewalls (and/or other network security components) and load balancers (for managing access to the server application 104).

The server system 102 components have been described as functional components, and may be implemented by hardware, software (data and computer readable instructions which are stored in memory and executed by one or more computer processing systems), and/or a combination of hardware and software.

The precise hardware architecture of server system 102 will vary depending on implementation, however may well include multiple computer processing systems (e.g. server computers) which communicate with one another either directly or via one or more networks, e.g. one or more LANS, WANs, or other networks (with a secure logical overlay, such as a VPN, if required).

For example, server application 104 may run on a single dedicated server computer and data store 106 may run on a separate server computer (with access to appropriate data storage resources). As an alternative example, server system 102 may be a cloud computing system and configured to commission/decommission resources based on user demand 104. In this case there may be multiple server computers (nodes) running multiple server applications 104 which service clients via a load balancer.

A single server system 102 has been shown in example environment 100. In certain embodiments, additional server systems may be accessible to a client system 110 (and/or server system 102)—for example third party content servers which the client and server systems can access to obtain content items such as vector graphics.

Client system 110 hosts a client application 112 which, when executed by the client system 110, configures the client system 110 to provide client-side functionality for/ interact with the server application 104 of the server system 102. Via the client application 112, users can interact with the server application 104 in order to perform various operations such as creating, editing, saving, retrieving/accessing, publishing, and sharing designs.

Client application 112 may be a web browser application (such as Chrome, Safari, Internet Explorer, Opera, or an alternative web browser application) which accesses the server application 104 via an appropriate uniform resource locator (URL) and communicates with server application 104 via general world-wide-web protocols (e.g. http, https, ftp). Alternatively, the client application 112 may be a specific application programmed to communicate with server application 104 using defined application programming interface (API) calls.

In the present example, client system 110 also includes a vector graphic recolouring component 114 (RC 114 for short). In the embodiments described below, the vector graphic recolouring component 114 performs (or configures the client application 112 to perform) processing associated with vector graphic recolouring.

RC 114 may be software module such as an add-on or plug-in that operates in conjunction with the client application 112 to expand the functionality thereof. In alternative embodiments, the functionality provided by the RC 114 may be natively provided by the client application 112 (i.e. the client application 112 itself has instructions and data which, when executed, cause the client application 112 to perform part or all of the vector graphic recolouring functionality described herein). In still further alternative embodiments, the RC 114 may be a stand-alone application which communicates with the client application 112.

By way of specific example, the functionality of the RC 114 may be provided by JavaScript running on a web browser client application 112.

Client system 110 may be any computer processing system which is configured (or configurable) by hardware and/or software to offer client-side functionality. By way of example, client system 110 may be a desktop computer, a laptop computer, a netbook computer, a tablet computing device, a mobile/smart phone device, a personal digital assistant, or an alternative computer processing system.

Although not illustrated in FIG. 1, client system 110 will typically have additional applications installed thereon, for example at least an operating system application such as a Microsoft Windows operating system, an Apple macOS operating system, an Apple iOS operating system, an Android operating system, a Unix or Linux operating system, or an alternative operating system.

The architecture described above and illustrated in FIG. 1 is provided by way of example only. Many variations are possible.

For example, while the RC 114 has been described and illustrated as being part of/installed at the client system 110, the functionality provided by the RC 114 could alternatively be provided by a server system 102 (for example as an add-on or extension to server application 104, a separate, stand-alone application that communicates with server application 104, or a native part of server application 104).

Further alternatively, the functionality provided by the RC 114 could be performed by a client application (e.g. 112) and server application (e.g. 104) operating in conjunction.

As yet a further alternative, the RC 114 could be provided as an entirely separate service—e.g. running on a separate server system to server system 102 and communicating with client application 112 (and/or server system 102) as required to perform the vector recolouring functionality described herein.

Furthermore, while a client-server architecture has been described, a content creation system including a RC 114 (or otherwise configured to perform vector recolouring) could be provided in a self-contained application that is installed and runs solely on a client system without any need of a server application.

The features and techniques described herein are implemented using one or more computer processing systems.

For example, in networked environment 100 described above, client system 110 is a computer processing system (for example a personal computer, tablet/phone device, or other computer processing system). Similarly, the various functional components of server system 102 are implemented using one or more computer processing systems (e.g. server computers or other computer processing systems).

Figure 2:
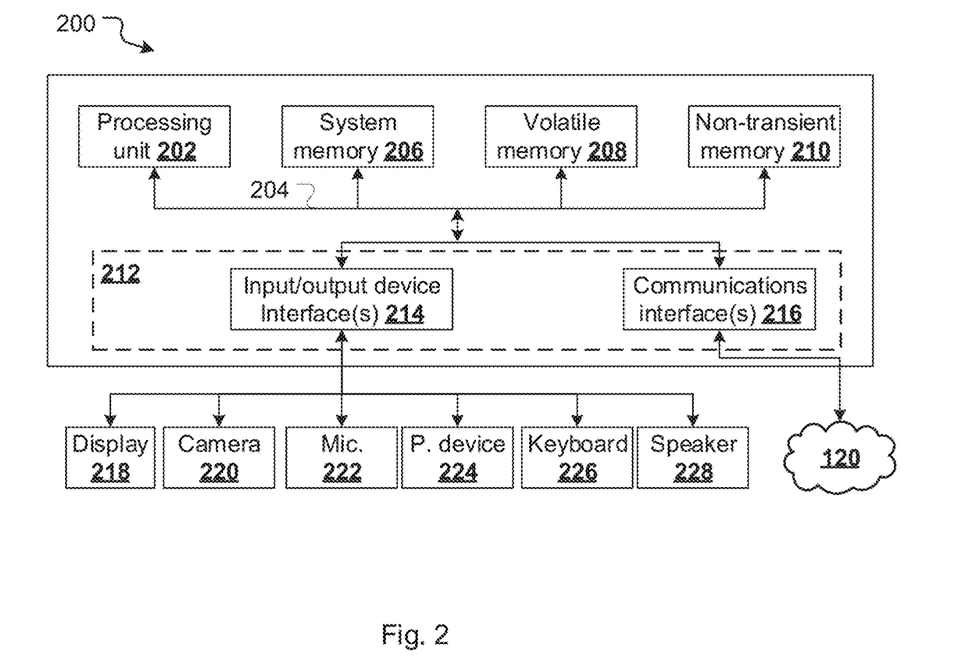
FIG. 2 is an example computer processing system configurable to perform various features described herein.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. In the present example, input/output devices interface with system 200 via one or more input/output device interfaces 214. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/ other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

By way of example, where system 200 is a client system (e.g. client system 110) it may include a display 218 (which may be a touch screen display), a camera device 220, a microphone device 222 (which may be integrated with the camera device), a pointing device 224 (e.g. a mouse, trackpad, or other pointing device), a keyboard 226, and a speaker device 228.

System 200 also includes one or more communications interfaces 216 for communication with a network, such as network 120 of environment 100 (and/or a local network within the server system 102 or OS 120). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over an interface such as 214 or 216.

Applications accessible to system 200 will typically include an operating system application such as Microsoft Windows, Apple macOS, Apple iOS, Android, Unix, or Linux.

System 200 also stores or has access to applications which, when executed by the processing unit 202, configure system 200 to perform various computer-implemented processing operations described herein. For example, and referring to the networked environment of FIG. 1 above: client system 110 includes a client application 112 which configures the client system 110 to perform the operations described herein.

In some cases, part or all of a given computer-implemented method will be performed by system 200 itself, while in other cases processing may be performed by other devices in data communication with system 200.

Figure 3:
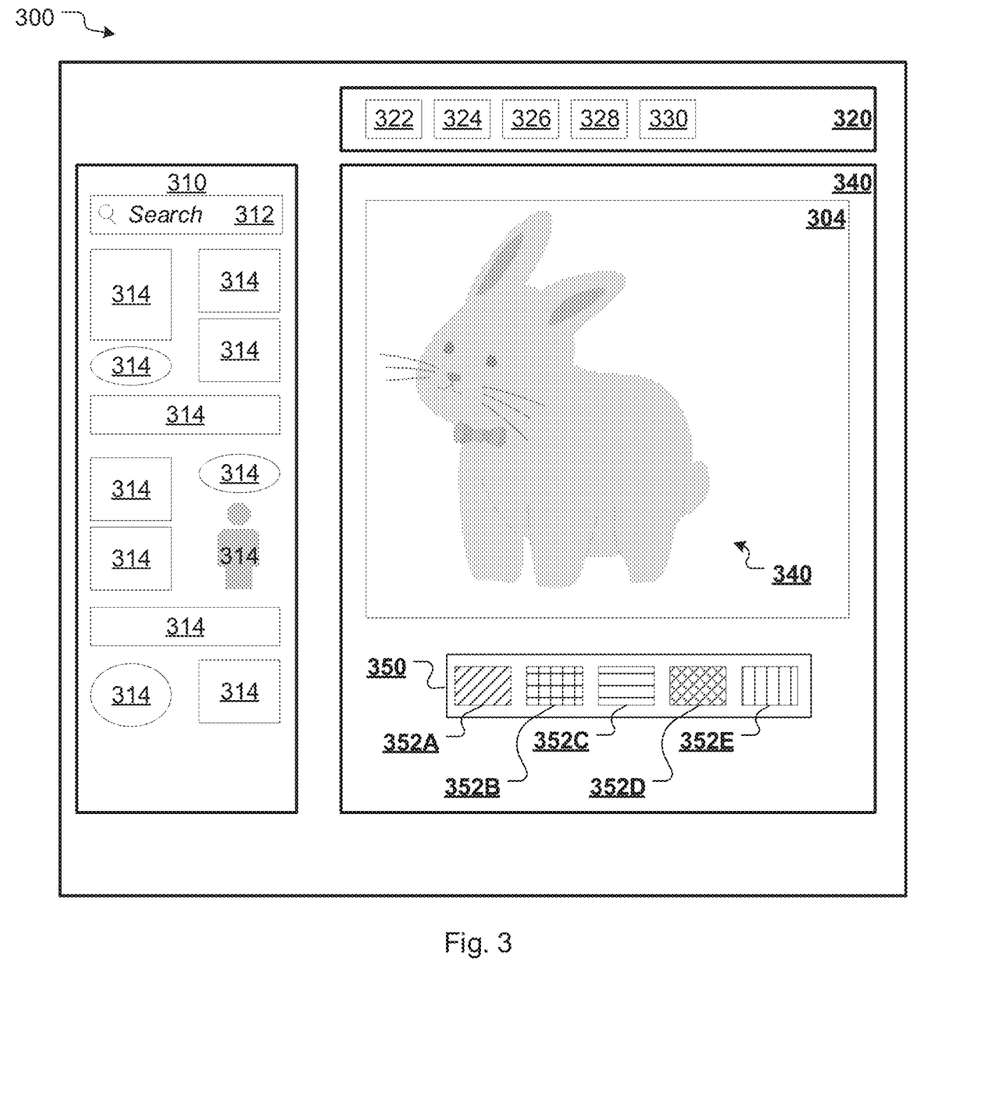
FIG. 3 provides an example user interface.

As described above, the present disclosure is generally concerned with recolouring vector graphics. Referring to FIG. 3, an example user interface 300 will be described by which a user can create a design, add design elements (such as vector graphics) to that design, and recolour design elements. It should be noted, however, that particular manner in which a design is created and/or a vector graphic is added to a design is not of specific relevance to this disclosure, and many alternative ways of doing so exist.

User interface 300 is, in the present example, displayed by a client system 102, e.g. on display 218, the client system 102 configured to do so by client application 104).

Via interface 300 a user can create a design document that comprises one or more pages and (inter alia) add design elements to the page. Example design creation interface 300 includes a design creation pane 302 in which the design currently being worked on is displayed. In the present example, design creation pane 302 shows a single page 304 of a design document.

Design creation interface 300 also includes a design element search and selection pane 310 via which a user can search or browse one or more design element libraries, view design element previews 314, and select design elements to be included in the design document. To this end, pane 310 includes a search box 312 (allowing in this case a user to enter search text) and design element previews 314 providing preview images of design elements. The search functionality may cause the client application 112 to search local memory of the client system 110 for design elements, server system 120 memory for design elements, and or third party server systems (not shown) for design elements.

Design elements previewed in the search and selection pane 310 can include vector graphic design elements, and can be added to the design being worked on (e.g. to page 304), for example by dragging and dropping, double-clicking, dwelling, or any other appropriate user interaction.

Design creation interface 300 also includes a toolbar 320 providing various tools for design creation and editing. In this particular example the tools include: a design element selection tool 322 allowing a user to select a particular design element that has been added to the page 304; a drawing tool 324 allowing a user to draw a design element having a geometric or other shape (some such design elements being saved in a vector graphic format); a text tool 326 allowing a user to add a textual design element; an import tool 328 allowing a user to import a design element from another source (e.g. a design element stored on locally or remotely accessible memory, a design element from a third party server, etc.).

While not shown, toolbar 320 will typically be an adaptive toolbar in that the tools provided change depending on what the user is doing. For example, if a user selects the text tool 326 additional (or alternative) tools relevant to text may be displayed: e.g. a font selection tool and a text size tool.

In the present example, toolbar 320 also includes a design element recolouring control 330, activation of which triggers a design element recolouring process as described below.

Generally speaking, in order to create a design a user creates a page and adds design elements to that page. Design elements can be added in various ways. For example, a user can interact with the design element search and selection pane 310 to search/browse for design elements and then add design elements to the design being created—e.g. by selecting a design element preview 314, dragging it to a position on the page 304, and dropping it. Alternatively, a user may create and add an entirely new design element—e.g. by drawing a design element using a tool such as drawing tool 324 or adding custom text via text tool 326. Further alternatively, a user may import a design element via import tool 330.

In this specific example, page 304 includes a single design element 340. The example design element 340 is a vector graphic design element. Given the limitations of black and white drawings, design element 340 is described further below with reference to FIG. 4.

Interface 300 of the present example further includes a colour palette menu 350 which includes a number (in this case 5) colour buttons 352A-352E. Display of the colour palette menu 350 may, for example, be: permanent; toggled on and off via a control (e.g. a menu or other control); displayed in response to selection of a particular element of group of elements; displayed in response to activation of a recolouring control 330; displayed in response to an alternative event (user or program driven).

The appearance of the colour buttons 352A-352E may change depending on context. For example, if no particular design element is selected, the client application 112 may be configured to cause each colour button 352 to display: a particular colour that has been used in the page being shown; a particular colour that has been used in the design that the current page being displayed belongs to; a colour that was recently used/selected by a user; a colour available to the user to use.

As described below, where a particular design element has been selected, the client application 112 is, in certain embodiments, configured to cause each colour button 352 to display a colour that is either used in the selected design element or is representative of a group of colours used in the selected design element. In this particular example, with five colour buttons 352, a maximum of five colours can be displayed at any given time. While the client application 112 can be configured to display additional (or fewer) colour buttons, there will be a practical limitation to the number of buttons that can be displayed—either due to available screen space or human cognition factors.

Interface 300 is provided by way of example only, and alternative user interfaces (with alternative user interface elements and controls) are possible.

As noted above, the present disclosure will provide examples using SVG format vector graphics. Information on the SVG format can be found in the Scalable Vector Graphics specification published by the World Wide Web Consortium.

Generally speaking, though, a given SVG is stored in a file that includes (inter alia) one or more elements. For clarity, the elements that make up a SVG will be referred to as SVG elements. This is in contrast to elements which are included in a design/design page, which will be referred to as design elements.

For example, design element 340 above is a SVG design element that includes multiple SVG elements. An abridged version of the SVG file for design element 340 (with specific path commands omitted) is as follows:

```
<path fill-rule="evenodd" clip-rule="evenodd" fill="#E8D5EA" d="..."/>
<path fill-rule="evenodd" clip-rule="evenodd" fill="#C58EBF" d="..."/>
<path fill-rule="evenodd" clip-rule="evenodd" fill="#CFA4CC" d="..."/>
<path fill="#DDBDDC" d="..."/>
<path fill="#BB76B0" d="..."/>
<path fill="#97C6D5" d="..."/>
<path fill="#7FB7C8" d="..."/>
<path fill="#7FB7C8" d="..."/>
<path fill="#7FB7C8" d="..."/>
```

Design element 340, therefore, is defined by nine paths and includes seven distinct colours (#E8D5EA, #C58EBF, #CFA4CC, #DDBDDC, #BB76130, #9706D5, and #7FB7C8).

Figure 4:
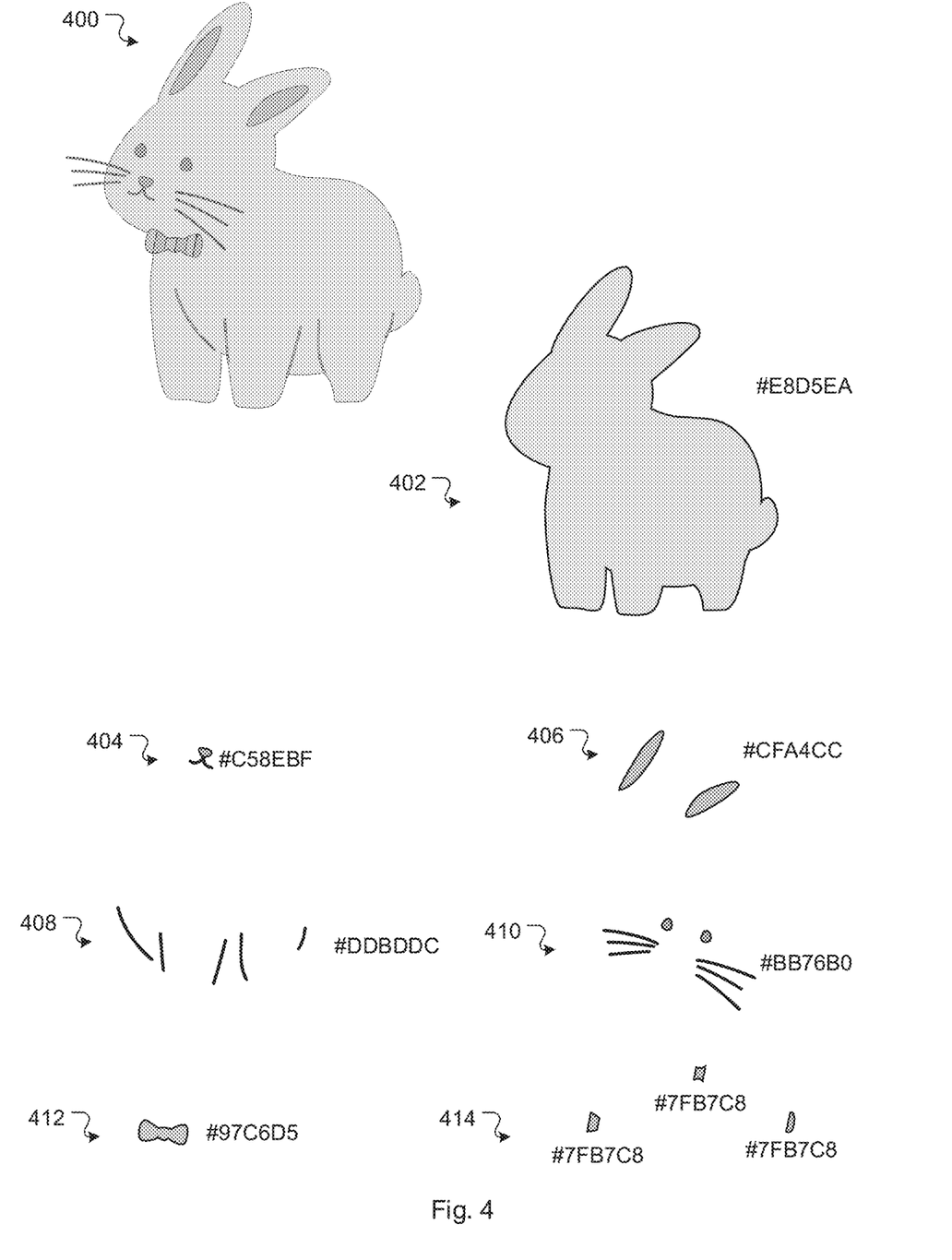
FIG. 4 depicts components of a vector graphic design element.

To illustrate these paths/colours, FIG. 4 provides a version of design element 340 but with black outlines to indicate the paths (the black outline not actually defined by the SVG example above, but added to FIG. 4 for illustrative purposes). FIG. 4 also shows each path separately. Specifically: the rabbit body 402 is colour #E8D5EA; the rabbit nose 404 is colour #C58EBF; the interior of the rabbit ears 406 is colour #CFA4CC, the leg accent lines 408 are colour #DDBDDC; the eyes and whiskers 410 are colour #BB76130, the bowtie background 412 is colour 97C6D5, and each of the three bowtie stripes 414 is colour #7FB7C8.

The SVG standard defines various types of SVG elements. These include, for example, shape elements defining particular shapes—for example rectangle elements, circle elements, ellipse elements, line elements, polyline elements, polygon elements, path elements.

A given SVG shape element can define or reference one or more colours. For example, a shape element may directly define a fill colour and/or a stroke colour. Alternatively, a shape element may reference another SVG element which defines one or more colours (for example a style element or a gradient element that defines 'stop' colours). Further alternatively, colour may be inherited from a parent element or configured via CSS.

To provide a simple example, the following defines a SVG which has: a width of 200; a height of 200; and a single rectangular element. The rectangular element has: width=100; height=100; a red fill (fill="rgb(255,0,0)"); and a blue line (stroke="rgb(0,0,255)") with a line weight of 5 (stroke-width:5).

```
<svg width="200" height="200">
    <rect width="100" height="100" fill="rgb(255,0,0)" stroke-width=5 stroke="rgb(0,0,255)"/>
</svg>
```

As another example, the following defines a SVG that has the same rectangle as above, but also includes a circle shape element to the right of that rectangle. The fill of the circle shape element is references another defined element of the SVG (fill="url(#gradient1)"). The referenced element is, in this case, a linear gradient that vertically transitions from red (<stop offset="0%" stop-color="red"/>) to blue <stop offset="100%" stop-color="blue"/>).

```
<svg width="400" height="200">
    <defs>
        <linearGradient id="gradient1" x1="0%" y1="100%" x2="0%" y2="0%">
            <stop offset="0%" stop-color="red"/>
            <stop offset="100%" stop-color="blue"/>
        </linearGradient>
    </defs>
    <circle cx="200" cy="50" r="50" fill="url(#gradient1)" />
    <rect width="100" height="100" fill="red" stroke-width=5 stroke="blue"/>
</svg>
```

Processing involved in order to recolour a selected vector graphic will now be described.

Certain operations are described as being performed by the vector graphic recolouring component (RC) 114. As noted above, RC 114 may be installed on a server system (such as 102) or client system (such as 110). Alternatively, the functionality provided by the RC 114 may be provided by a server application (such as server application 104 running on a server system 102), a client application (such as client application 112 running on a client system 110), or by a combination of applications running on the same or different systems.

Figure 5:
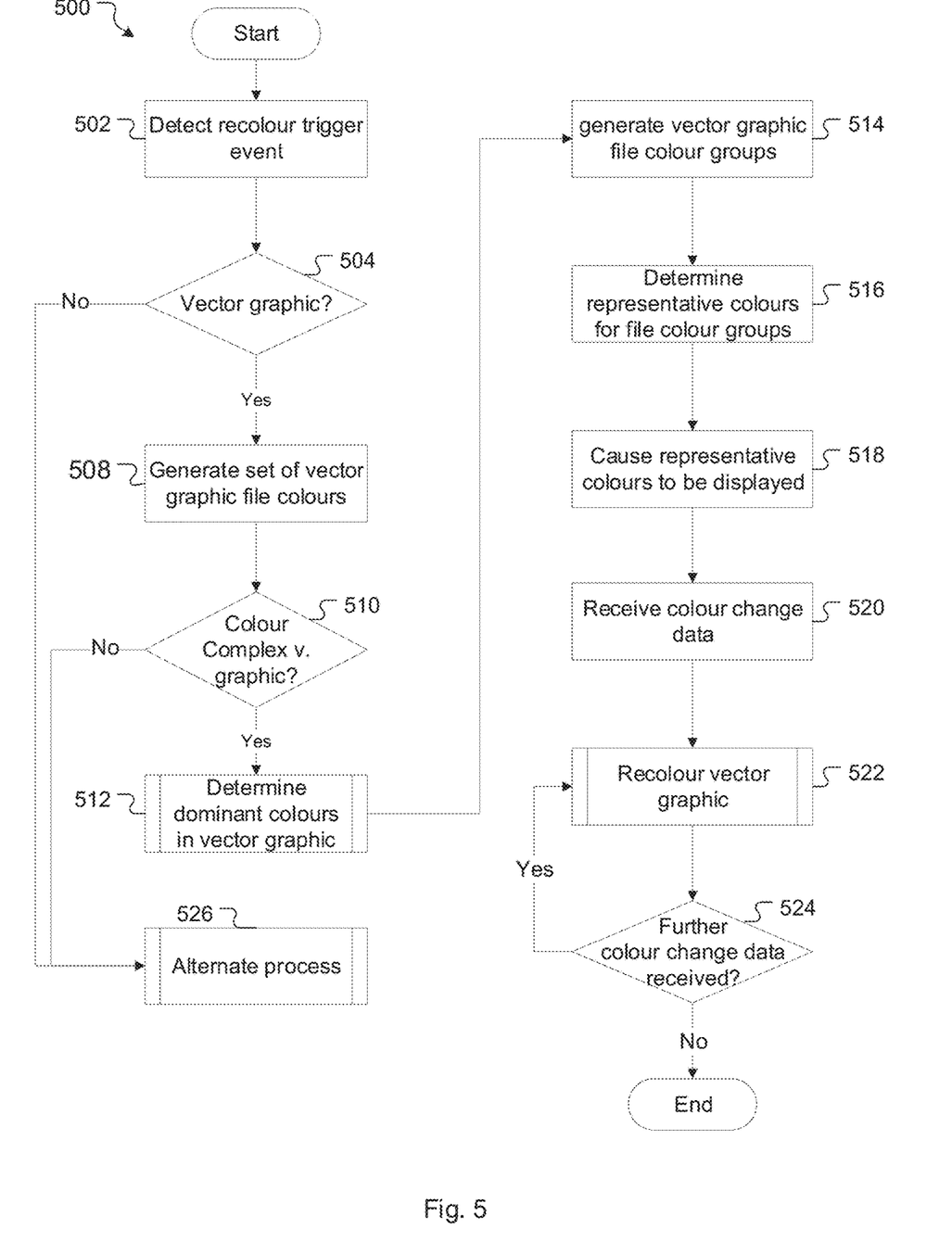
FIG. 5 is a flowchart depicting operations involved in a vector graphic recolouring process.

FIG. 5 is a flowchart depicting operations involved in a vector graphic recolouring process 500.

At 502, a recolouring trigger event is detected.

In client-server architectures where the RC 114 runs on the server system 102 (as described above with reference to FIG. 1), a trigger event may be detected by the client application 112 or the server application 104. If detected by the client application 112 detection of the trigger event causes the client application 112 to notify the server application 104 of the trigger event.

In stand-alone implementations (e.g. where all processing is performed by a single computer, such as client system 110) the trigger event is detected by the client application.

In the present embodiment, receiving user input at client system 110 (e.g. via a touch screen display 218 or other input device) that activates a specific user interface control (e.g. the 'design element recolouring' control 330 as described above) is a recolouring trigger event. Other trigger events are possible, for example user input to copy/paste a style, user input invoking a colour palette application, user input to effect a 'change all' colours, user input to undo or redo a previous action, and/or other trigger events.

In the present embodiment, the recolour trigger event is in respect of a specific design element. As an example, the design element may be specified by a user selecting the element in the user interface 300 (e.g. by clicking on it, contacting it, or otherwise selecting it) prior to activating the recolouring control 330.

At 504, a determination is made (by either the client application 112 or server application 104) as to whether the specific design element is a vector graphic.

If the specific design element is not a vector graphic (and is, for example, a bitmap or the like), or processing proceeds to 526.

If the specific design element is a vector graphic, processing (in the present example) proceeds to 508.

At 508, the RC 114 processes the vector graphic design element (or, specifically, the file defining the design element) to determine a set of file colours. Each file colour in the set of file colours is a colour defined in the vector graphic file.

The RC 114 can be configured to determine the set vector graphic file colours in various ways. An example implementation is described below with reference to FIG. 6. The set of file colours can be recorded in any appropriate way, for example a list or array (or any other appropriate data type/structure) in which each element is a unique colour defined by the vector graphic file. By way of illustration, for the SVG file above including a square and circle, the set of file colours may be as follows:

[rgb(255,0,0), rgb(0,0,255)]

As can be seen, although the SVG file defines the colour rgb(255,0,0) twice (once as a stop colour and once as a fill colour) the colour is only recorded once in the set of file colours.

As a further example, for the 'rabbit' SVG file above, the set of file colours (in hexadecimal format) may be as follows:

[#E8D5EA, #C58EBF, #CFA4CC, #DDBDDC, #6676130, #9706D5, #7FB7C8]

In certain implementations, after determining the vector graphic file colours the RC 114 generates converted file colour values which are used in downstream processing. Each converted file colour value corresponds to an actual file colour, however has been converted into a particular colour model format. In the present embodiment, the RC 114 converts each file colour into a CIE-L*ab value (LAB value for short). Various algorithms for converting a given colour from one colour model (e.g. RGB) to another (e.g. LAB) are known. By way of example, converted file colours corresponding to the SVG file above (including a square and circle) could (depending on the conversion algorithm used) be as follows:

[LAB(54.2917, 80.8125, 69.8851), LAB(29.5676, 68.2986, −112.0294)]

In certain implementations, the RC 114 determines all colours defined in the vector graphic file at 508. In alternative implementations, the RC 114 determines only a subset of the colours defined in the file—for example only fill colours (and not line/stroke colours). In such implementations, the recolouring is limited to the subset of file colours determined at 508.

At 510 of the present embodiment, the RC 114 determines whether the design element is a colour complex vector graphic. This determination is made in order to forgo the more intensive processing described below in the event that it is not warranted/needed.

In certain implementations, the RC 114 determines whether a design element is a colour complex vector graphic by determining whether it defines at least a threshold number of colours—e.g. whether the number of vector graphic file colours as determined at 508 is greater than or equal to a threshold number of colours n (e.g. n=5).

If the RC 114 determines that the design element is not a colour complex vector graphic, processing proceeds to 526.

If the RC 114 determines that the design element is a colour complex vector graphic, processing proceeds to 512.

At 512, the RC 114 determines a number (k) of dominant colours that are present in the vector graphic design element. Processing a design element to determine dominant colours is described below with reference to FIG. 7. In the present example, this processing generates a dominant colour data structure (e.g. a list or the like) of k dominant colours for the vector graphic being processed.

At 514, the RC 114 generates a set of file colour groups. This involves associating each (or at least some) of the vector graphic file colours (determined at 508) with one of the dominant colours (determined at 512).

Association of a given vector graphic file colour with a particular dominant colour can be performed in various ways, and will depend on the colour space being used. By way of example for the LAB or RGB colour spaces, the RC 114 calculates the distances (e.g. Euclidian distance) between the given colour and each of the dominant colours. The RS 114 then associates the given colour with the particular dominant colour it is closest to. If the given colour is equidistant from two or more dominant colours it can be associated with any one of those dominant colours.

In certain implementations, if the distance between a given file colour and its closest dominant colour exceeds a distance threshold, the given file colour is excluded from recolouring (for example by removing from the list of file colours generated at 508 or otherwise flagging the colour). Any colour excluded from being recolouring retains its original colour in any downstream recolouring processing. Where it is applied, the distance threshold may be set in various ways. For example, the threshold distance may be determined based on a statistical analysis of the distances of all file colours from their closest dominant colours, e.g. by setting the threshold distance at a value equal to 2 standard deviations from the mean of the file colour to closest dominant colour distances. Alternatively, the threshold distance may be manually configured by a user.

The RC 114 stores the file colour groups created at 514 in a file colour group data structure, each record of which associates a particular file colour with a particular group identifier. The group identifier may be the value of the dominant colour used to generate the group. By way of example, the file colour group data structure may be a table structure as follows (using RGB values for convenience, though noting that in certain implementations LAB values are used):

| File colour | Group identifier |
|---|---|
| 255, 255, 255 | 255, 255, 255 |
| 255, 255, 254 | 255, 255, 255 |
| 255, 254, 255 | 255, 255, 255 |
| 254, 255, 255 | 255, 255, 255 |
| 0, 125, 15 | 0, 125, 0 |
| 1, 120, 15 | 0, 125, 0 |
| ... | ... |

As can be seen, each file colour maps to a single group identifier (in this case the dominant colour value) but each group identifier can be associated with multiple file colours.

At 516, in the present embodiment, the RC 114 determines a representative colour for each of the vector graphic file colour groups created at 514.

In certain implementations, the RC 114 is configured to determine the representative colour for a given colour group to be the dominant colour that was used to generate that group.

In alternative implementations, the RC 114 is configured to determine the representative colour for a given colour group by calculating a new colour based on the file colours that are members of that colour group. In this case, for example, the RC 114 calculates the average colour of all file colours that are members of the given group and use that average as the representative colour for the given group. When calculated in this way, the average colour may be the same as an existing file colour (or the dominant colour) but may not.

Where the RC 114 calculates the average colour of all file colours that are members of a group it may be configured to do so based on a specific colour space format for the colours—e.g. LAB values. In this case, if the file colours have not already been converted to LAB values this is done by the RC 114 (for example as described above).

Where representative colours are calculated (rather than dominant colours being used), the RC 114 can be configured to store them in a representative colour data structure, for example (again using RGB values for convenience):

| Group identifier | Representative colour |
|---|---|
| 255, 255, 255 | XXX, XXX, XXX |
| 0, 125, 0 | XXX, XXX, XXX |

Alternative means for associating a colour group with its representative colour are possible.

At 518, the RC 114 causes the colour group representative colours to be displayed in a user interface (e.g. on display 218). Where the RC 114 is implemented server side, this involves communicating the representative colours to the client application 112.

Various user interfaces can be generated to display the representative colours, however in the present example each representative colour is displayed in a colour button 352 of the colour palette menu 350. Where the number of colour groups (and, therefore, representative colours thereof) is fewer or greater than the number of colour buttons 352, the client application 112 may be configured to adapt the user interface to display additional/fewer colour buttons 352 accordingly.

At 520, the RC 114 receives colour change data.

In the present example, the colour change data is generated based on a colour change user input made at client system 110 and received by the client application 112. The colour change data is passed to the RC 114 (e.g. to the server application 104 where RC 114 is implemented server side).

In the present embodiment, the colour change data includes a colour group identifier indicating a particular colour group that is to be changed and new colour data indicating a new colour for that particular colour group.

Various colour change user interfaces and user inputs for selecting a colour group and a new colour for that group are possible.

For example, with reference to user interface 300 described above, a user may select a particular colour group to change by selecting a particular button 352. Per 518, the particular button 352 will display a representative colour of a particular colour group—that particular colour group defining the colour group identifier of the colour change data.

Selection of a particular button 352 may also cause a colour selection interface to be displayed (if not already displayed), by which the user can select a new colour (thereby generating the new colour data). Any appropriate colour selection interface may be provided and used, for example: a colour slider, providing a slide control operable by a user to select a colour; a colour wheel/palette/picker control, operable by a user to select a particular colour; a text entry field into which a colour can be entered (either as plain text, RGB value, or alternative colour definition); a colour picker tool (e.g. an eyedropper type tool) operable to select another colour displayed on the user's screen; or any other colour selection interface.

Typically once a new colour is selected, the colour of the particular button selected will be changed. In certain implementations, the button is changed to the new colour that is selected. In alternative implementations, a new colour for the button is calculated based on the average the colours in the group after recolouring has been performed (at 522). This can be done in the same, or a similar way, to the manner in which representative group colours are calculated at 516.

At 522, in response to receiving the colour change data, the RC 114 adjusts the colours of the vector graphic in question. An example colour adjustment process is described below with reference to FIG. 8.

At 524, the RC 114 determines if further colour change data is received. This may occur, for example, if the user selects a new colour group to adjust (via an alternative colour button 352) and adjusts that new representative colour, or a user makes a further adjustment to the same colour group. If further colour change data is received, processing returns to 520 to recolour the vector graphic.

If no further colour change data is received (e.g. the user closes the design in question, exits the re-colouring mode by selecting an alternative control, or makes no input in a defined time period) recolouring process 500 is complete. In this case the user may accept the colour changes (in which case the recoloured vector graphic is saved) or reject them (in which case the changes are discarded).

At 526, the RC 114 has either determined that the design element is not a vector graphic (at 502) or is not a colour complex vector graphic (at 510). In either case, an alternative process (not described) is initiated. Depending on implementation, and how operation 526 is reached, the alternative process may simply be the generation of a message indicating that the element is not a vector graphic and recolouring cannot be performed. Alternatively, the client application 112 and/or server application 104 may be configured to perform an alternative recolouring process that is appropriate to the type of design element in question (e.g. a bitmap recolouring process) and/or colour complexity of the design element in question.

While not described above, the RC 114 can be configured to store various data generated for a given vector graphic (e.g. in data store 106 where the RC 114 is operating server side and/or local memory of client system 110) so this data does not need to be regenerated/recalculated in any downstream recolouring of the vector graphic in question. For example, the list (or other data structure) of file colours determined at 506, the dominant colours determined at 512, the file colour groups created at 514, and/or the representative group colours determined at 516 may be persistently stored for future reference.

In process 500, recolouring is described as an end to end process that is performed in response to a specific trigger event. In alternative embodiments, however, the processing involved in recolouring a vector graphic may be broken up into recolouring preparation operations and actual recolouring operations.

For example, it will be appreciated that some or all of the following can be performed (and the data generated by them stored) as recolouring preparation operations: 508 (determining file colours), 512 (determining dominant colours), 514 (creating file colour groups), and 516 (determining representative file group colours). Doing so effectively prepares the vector graphic for any downstream recolouring events.

If these operations are performed in advance, when a user (human or programmatic) elects to actually recolour a vector graphic only the actual recolouring operations (522) are required.

Where this model is adopted, the relevant application (client application 112 or server application 104) can be configured to perform some or all of the preparatory operations at any appropriate time: e.g. when a vector graphic is added to a library, when a vector graphic is added to a design page, or at an alternative time. The data generated by the preparatory operations can then be saved in an appropriate data store and associated with the vector graphic for retrieval as required.

Figure 6:
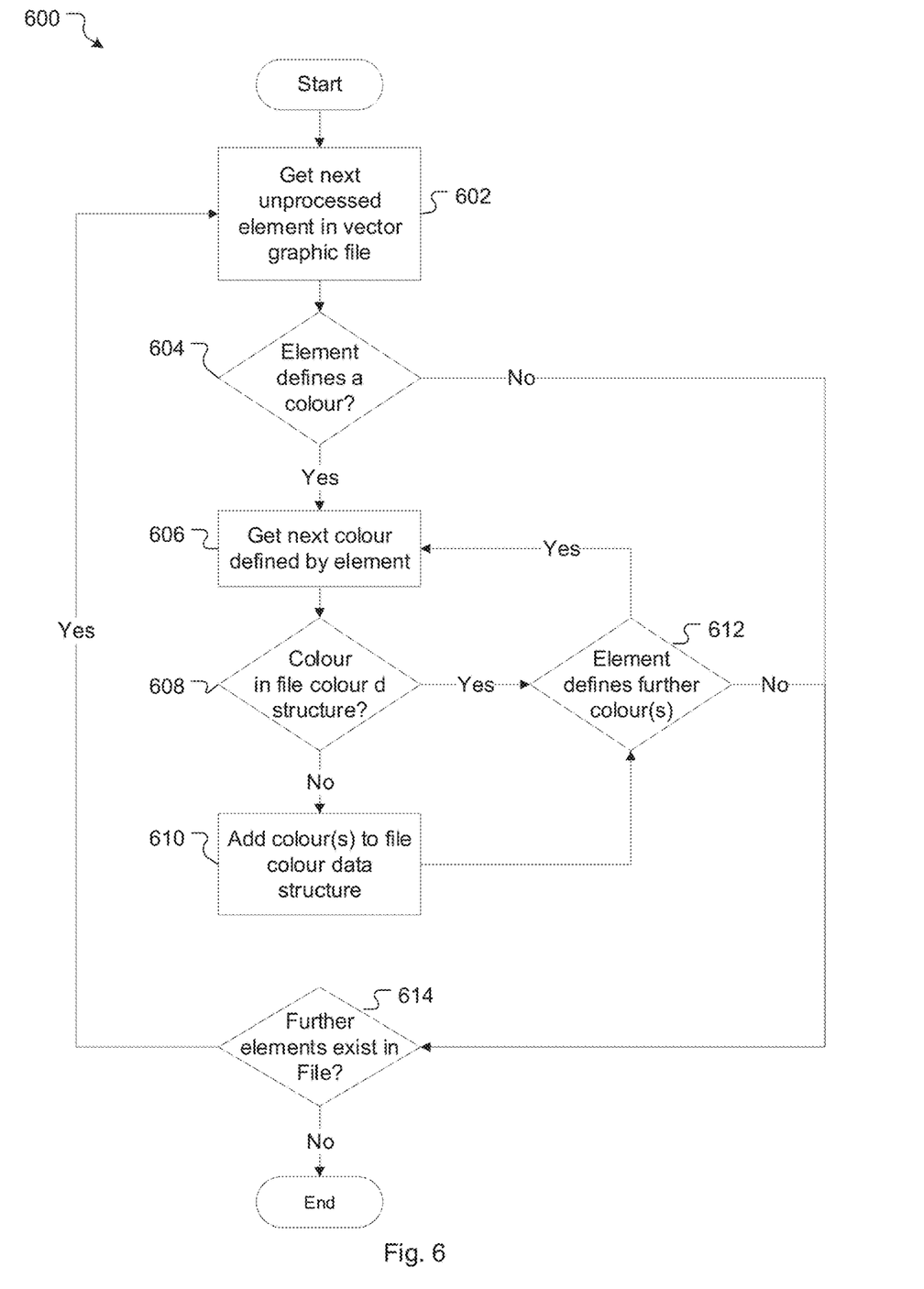
FIG. 6 is a flowchart depicting operations involved extracting vector graphic file colours.

At 508 of process 500 above, the RC 114 processes a vector graphic file to determine/generate a set of file colours. FIG. 6 provides an example process 600 for doing this.

At 602, the RC 114 retrieves the next unprocessed vector graphic element defined in the vector graphic file. The RC 114 may traverse the vector graphic elements in any order, provided all elements are processed.

At 604, the RC 114 determines whether the current element defines one or more colours. If the current element defines one or more colours, processing proceeds to 606. If it doesn't, processing proceeds to 614.

At 606, the RC 114 gets the next unprocessed colour in the current element. The RC 114 may traverse the colours defined by the element in any order, provided all colours defined by the element are processed.

At 608, the RC 114 determines if the current colour is already recorded (e.g. in a set (or alternative data structure) of file colours being maintained). If so, processing proceeds to 612.

If the current colour is not already recorded in the set of file colours, processing proceeds to 610. At 610, the RC 114 adds the current colour to the set of file colours. Processing then proceeds to 612.

In certain implementations the RC 114 is configured only to add certain types of file colours to the set of file colours—for example all colours other than line (stroke) colours. In such implementations an additional determination can be made at 608 to determine if the current colour is of the type being added to the set. If not, the colour is ignored. If so, and the colour has not already been added to the set of file colours, it is added.

At 612, the RC 114 determines whether the current element defines one or more further colours that have not been processed. If so, processing returns to 606 to process that/those colour(s). If all colours defined by the current element have been processed, processing continues to 614.

At 614, the RC determines whether any unprocessed elements in the file exist. If so, processing returns to 602 to process the next element. If all elements have been processed generation of the set of file colours is complete.

Alternative processing to generate a set of file colours can be implemented. As another example, the RC 114 can be configured to traverse the vector graphic file and initially add all colours defined by all elements to the set. Following this the RC 114 can process the set to remove any duplicate colours.

Figure 7:
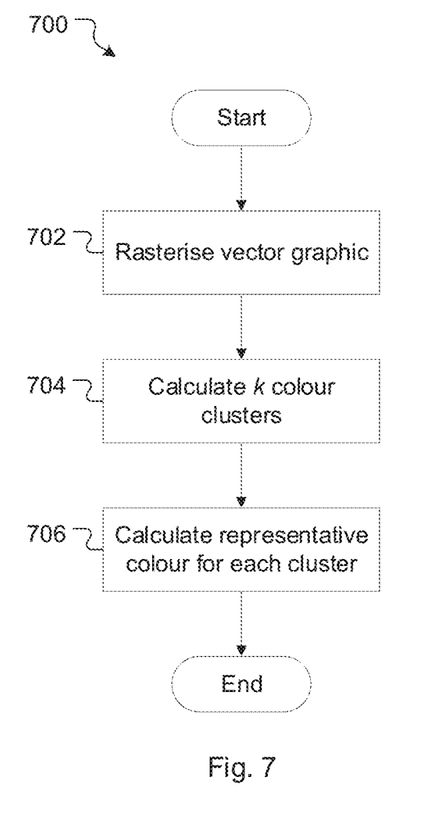
FIG. 7 is a flowchart depicting operations involved in determining dominant colours in a vector graphic.

At 512 of process 500 above, the RC 114 processes a vector graphic to determine dominant colours. FIG. 7 provides an example process 700 for doing this.

At 702, the RC 114 rasterises the vector graphic to generate raster data that defines a raster version of the graphic.

Various colour schemes can be used in the determination of dominant colours (e.g. CIE, RGB, HSV, CMYK, or alternative colour schemes). In the present embodiments, however, the CIE-L*ab colour model (LAB) is used. Accordingly, the rasterisation at 702 is configured to convert rasterised pixels into the LAB colour model for processing.

At 704, the RC 114 employs a clustering algorithm on the raster data to calculate a number (k) of colour clusters within the graphic—i.e. clusters of similarly coloured pixels.

Various algorithms can be used for this, for example a k-means clustering algorithm.

At 706, the RC 114 calculates a representative colour for each cluster calculated at 704. This can be performed for a given cluster, for example, by calculating an average colour of all pixels assigned to the given cluster.

Each of the representative colours calculated at 706 is recorded as a dominant colour of the vector graphic.

The number of colour clusters k (and, therefore, the number of dominant colours determined) can be determined in various ways.

In certain implementations, k may be a pre-defined value. For example, k may be set to be the number of distinct colour buttons 352 that are displayed in the a colour palette menu 350. In this case, if the user interface allows a user to increase or decrease the number of colour buttons 352 (and a user does so), the value of k will change accordingly.

In alternative implementations, k can be determined according to user input (and take a default value if no user input is received). In such embodiments, results of the dominant colour determination (and/or recolouring process as a whole) can be presented to a user who may then increase or decrease the number of clusters in order to provide a different number of dominant colours and a different number of results.

In still further implementations, a clustering algorithm (and/or parameters thereof) that itself determines the number of clusters may be used—e.g. a mean shift clustering algorithm.

At 522 of process 500 above, the RC 114 adjusts the colours of a vector graphic based on colour change data. The colour change data includes a colour group identifier indicating a particular colour group that is to be changed and new colour data indicating a new colour for that particular colour group.

Figure 8:
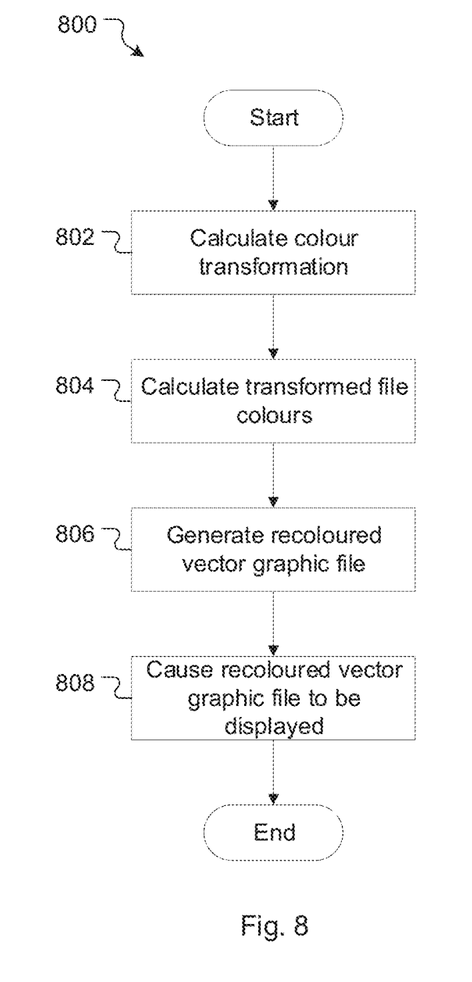
FIG. 8 is a flowchart depicting operations involved in adjusting the colours of a vector graphic.

Turning to FIG. 8, a process 800 for adjusting the colours of a vector graphic will be described. Process 800 is assumes that all colours are expressed in a common format (e.g. RGB, LAB, or an alternative format). If this is not the case, conversions can be performed as required.

At 802, the RC 114 calculates a colour transformation that maps the representative colour of the particular colour group being changed (as identified by the colour group identifier) to the new colour that has been selected for that group.

Calculation of the colour transformation at will depend on the colour space being used. For example, in the LAB colour model, this may involve calculating the exact change made within the three-dimensional space to the representative colour and applying that change to all colours within the group. For example, if a representative LAB colour was changed from [60, 50, 50] to [55, 50, 50], then a representative colour that was originally [51, 48, 30] would be changed to [46, 48, 30].

At 804, the RC 114 uses the colour transformation determined at 802 to calculate a transformed file colour corresponding to each original file colour (as determined at 508) in the particular colour group selected for recolouring at 520.

Calculating a transformed file colour corresponding to a given original file colour can be done in various ways.

In certain embodiments, the RC 114 directly applies the colour transformation determined at 802 to the original file colour in question.

If this results in a new colour value that is within the colour space being used, the result is recorded as the transformed file colour corresponding to the original file colour. If, however, the transformation results in a new colour value that is outside the colour space being used—i.e. the gamut boundary is reached—the transformed file colour is recorded as the colour at the gamut boundary.

A potential issue with this approach is that important colour information can be lost in the transformation. Consider, for example, a shape with a colour gradient transitioning from one colour to another. If a stop colour in the middle of the gradient reaches (or passes) the gamut boundary, that stop colour will be transformed to the gamut boundary colour, as will all subsequent stop colours in the gradient. In this case, transformation will result in a portion of the original shape being a solid colour rather than a smoothly transitioning gradient.

In order to address this issue, in alternative implementations the RC 114 does not directly apply the colour transformation determined at 802 to the original file colour. Instead, the RC 114 calculates transformed file colours such that they approach gamut boundaries proportionally based on their original distance from the boundary.

Once calculated, the transformed file colours may be stored in a transformed file colour data structure that includes a record for each original file colour that associates the original file colour with a transformed colour. Any appropriate data type or structure may be used, but by way of example the transformed file colour data structure may be a table as follows:

| Original file colour | Transformed file colour |
|---|---|
| ... | ... |

At 806, the RC 114 generates a recoloured vector graphic file. To do so, the RC 114 traverses the original vector graphic file (or a copy thereof) and replaces each original file colour with its corresponding transformed file colour.

Where only a subset of file colours are being recoloured, this is taken into account at 806. For example, if only fill colours are being recoloured (and not line/stroke colours), only fill colours are replaced at 806.

At 808, the RC 114 causes the recoloured vector graphic file to be displayed by the client application 112 (e.g. on display 218) in place of the original vector graphic file. Where the RC 114 is performing operations server-side this involves communicating the recoloured vector graphic file to the client application 112 (via the server application 104).

Alternatively, instead of the RC 114 generating the recoloured vector graphic file at 806, the RC 114 could communicate the transformed file colour data structure to the client application 112 which could then itself generate the recoloured vector graphic file.

In addition to transforming individual file colours that are members of the particular group that has been selected at 804, the RC 114 may determine a representative colour for the colour group that has been changed. This can be done in various ways. For example, the RC 114 may use the new colour selected at 520 as the new representative colour for the transformed colour group. Alternatively, the RC 114 may calculate a new representative colour for the group based on the colours (as transformed) that are members of that colour group (e.g. the average of the transformed group colours or an alternatively calculated colour). Once the representative colour for the transformed group has been calculated the RC 114 may cause this to be displayed (e.g. using a colour button 352 that was selected to cause the recolouring).

Process 800 is then complete.

An example recolouring process will be described with reference to the vector graphic design element 340 (described above with reference to FIG. 4).

Referring to vector graphic design element 340 as described above, the file colours identified at 508 (in this case fills only) may be represented in a file colour table as follows (the file colours numbered 1 to 7).

| Ref. | Original file colour |
|---|---|
| 1 | #E8D5EA |
| 2 | #C58EBF |
| 3 | #CFA4CC |
| 4 | #DDBDDC |
| 5 | #BB76B0 |
| 6 | #97C6D5 |
| 7 | #7FB7C8 |

At 512, two dominant colours are identified, at 514 each of the file colours is assigned to a group (group A or group B), and at 516 representative colours for the groups are determined. This is depicted in the following table:

| Ref. | Original file colour | Colour group | Representative group colour |
|---|---|---|---|
| 1 | #E8D5EA | A | #CB8DBC |
| 2 | #C58EBF | A | #CB8DBC |

| Ref. | Original file colour | Colour group | Representative group colour |
|---|---|---|---|
| 3 | #CFA4CC | A | #CB8DBC |
| 4 | #DDBDDC | A | #CB8DBC |
| 5 | #BB76B0 | A | #CB8DBC |
| 6 | #97C6D5 | B | ... |
| 7 | #7FB7C8 | B | ... |

In this example, the original colours (references 1 to 5) have been assigned to Group A, the representative colour for which has been calculated as #CB8DBC.

The representative colours for Group A and Group B may then be displayed at 518 (e.g. in colour buttons 352 of a colour palette menu 350).

At 520, a user may then select the colour button representing Group A and, via a colour change interface, change the colour representing Group A to a new colour—in this case colour #495ECB. This causes new colours to be calculated (at 804) for each original file colour that was determined to be in colour group A (per the 'recalculated file colour' column). In this case a new representative group colour is also determined for group A, the new representative group colour reflecting the colour change that has been made for that group. E.g.:

| Ref. | Original file colour | Colour group | Original represent. group colour | Selected new colour for group | Recalculated file colour | Recalculated representative group colour |
|---|---|---|---|---|---|---|
| 1 | #E8D5EA | A | #CB8DBC | #495ECB | #599FFB | #4572DA |
| 2 | #C58EBF | | | | #3E60CE | |
| 3 | #CFA4CC | | | | #4572DA | |
| 4 | #DDBDDC | | | | #4B8AED | |
| 5 | #BB76B0 | | | | #364BC0 | |

At 806, the recoloured vector graphic file is generated. In this case, an abridged version of the recoloured SVG file (with specific path commands omitted) is as follows:

```
<path fill-rule="evenodd" clip-rule="evenodd" fill="#599FFB" d="..."/>
<path fill-rule="evenodd" clip-rule="evenodd" fill="#3E60CE" d="..."/>
<path fill-rule="evenodd" clip-rule="evenodd" fill="#4572DA" d="..."/>
<path fill="#4B8AED" d="..."/>
<path fill="#364BC0" d="..."/>
<path fill="#97C6D5" d="..."/>
<path fill="#7FB7C8" d="..."/>
<path fill="#7FB7C8" d="..."/>
<path fill="#7FB7C8" d="..."/>
```

As can be seen, when the recoloured SVG file is compared with the original SVG file: the colours of the first five path elements (defining colours determined to be in group A) have changed; the colours of the last four path elements (defining colours determined to be in group B) have not changed. The result of this is that the colours of the rabbit itself have changed but not the colours of the rabbit's bowtie.

Figure 9:
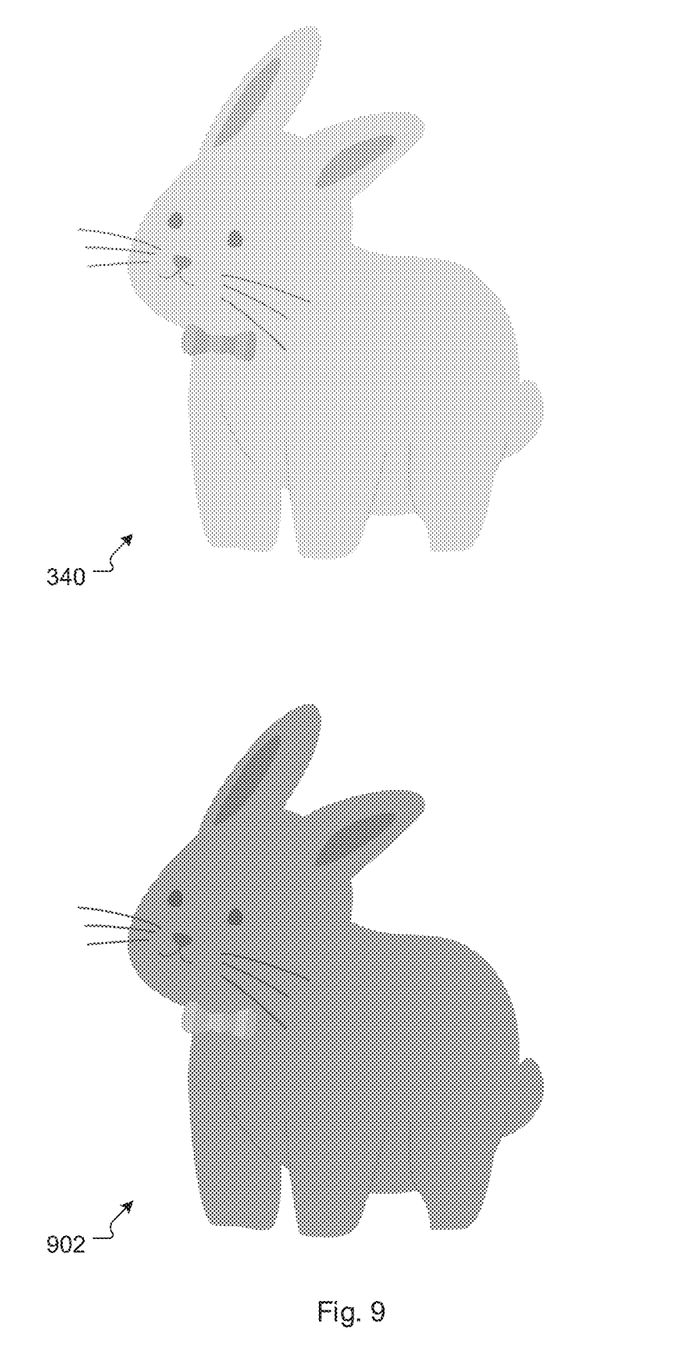
FIG. 9 provides a visual depiction of recolouring a vector graphic.

FIG. 9 provides an illustration (albeit in greyscale) of the original vector graphic 340 and the recoloured version of that vector graphic 902.

Various adjustments can be made to the processing described above.

By way of example, in certain implementations the RS 114 is configured to determine (e.g. at 512 after rasterising the graphic) whether any particular colours or colour bands—e.g. black or near black) have a % of pixels associated with them that is less than a defined threshold (e.g. if <n % of the graphic's pixels are of a particular colour/colour band—n, for example, being 5%). If so, those colours can be ignored in the determination of dominant colours and removed from further recolouring (e.g. by mapping the relevant colour back to one or more file colours and removing that/those file colours from the list of file colours generated at 508).

As a further example, in certain implementations after determining dominant colours the RS 114 is configured to determine if the percentage of pixels associated with any dominant colour is less than a defined threshold (e.g. 5%) number. If so, the RS 114 recalculates the dominant colours ignoring those pixels.

The recolouring process is described above in respect of a single vector graphic. The processing can, however, be performed (or be adapted to be performed) on multiple vector graphics—e.g. a group of vector graphics. In this case various steps are adjusted. E.g., at 508, vector graphic file colours are determined for all vector graphics being processed (and from there on all file colours are used in further processing).

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:
processing, by a processing unit, a vector graphic to determine a set of file colours, wherein the vector graphic includes a plurality of vector graphic elements and each file colour in the set of file colours is a colour defined by one or more of the vector graphic elements;
rasterising the vector graphic to generate raster data that defines a raster version of the vector graphic;
processing the raster data to determine a set of dominant colours defined by the vector graphic; and
generating a set of file colour groups, wherein each file colour group is associated with a dominant colour of the set of dominant colours and with one or more file colours from the set of file colours, and wherein generating the set of file colour groups includes generating a first file colour group by:
selecting a first file colour of the set of file colours;
determining that the first file colour is closest to a first dominant colour of the set of dominant colours; and
associating the first file colour with the first dominant colour.

2. The computer implemented method according to claim 1, wherein processing the raster data to determine the plurality of dominant colours defined by the vector graphic comprises:
processing the raster data to determine a plurality of colour clusters;
calculating a representative cluster colour for each colour cluster; and
determining each representative cluster colour to be a dominant colour.

3. The computer implemented method according to claim 2, wherein calculating the representative cluster colour for a first colour cluster comprises calculating an average colour of all pixels associated with the first colour cluster.

4. The computer implemented method according to claim 1, wherein determining that the first file colour is closest to the first dominant includes calculating distances between the first file colour and each dominant colour in the set of dominant colours.

5. The computer implemented method according to claim 1, further comprising:
determining a first representative group colour for the first file colour group; and
displaying the first representative group colour on a display.

6. The computer implemented method according to claim 5, wherein determining the first representative group colour comprises calculating an average colour of all file colours associated with the first file colour group.

7. The computer implemented method according to claim 1, wherein generating the set of file colour groups includes:
selecting a second file colour of the set of file colours;
determining that a distance between the second file colour and a closest dominant colour in the set of dominant colours exceeds a distance threshold; and
not assigning the second file colour to any file colour group.

8. The computer implemented method according to claim 1, wherein each file colour in the set of file colours is a fill colour defined one or more of the vector graphic elements.

9. The computer implemented method according to claim 1, wherein each file colour in the set of file colours is a stroke colour defined one or more of the vector graphic elements.

10. The computer implemented method according to claim 1, further comprising:
receiving colour change input data identifying the first file colour group and a new colour; and
in response to receiving the colour change input data:
determining a colour transformation describing a change from a first representative group colour of the first file colour group to the new colour;
for each file colour associated with the first file colour group, calculating a corresponding transformed file colour using the colour transformation;
recolouring the vector graphic by replacing each file colour associated with the first file colour group with its corresponding transformed file colour; and
displaying, on a display, the recoloured vector graphic.

11. A computer processing system comprising:
a processing unit; and
a non-transitory computer-readable storage medium storing instructions, which when executed by the processing unit, cause the processing unit to perform a method comprising:
processing a vector graphic to determine a set of file colours, wherein the vector graphic includes a plurality of vector graphic elements and each file colour in the set of file colours is a colour defined by one or more of the vector graphic elements;
rasterising the vector graphic to generate raster data that defines a raster version of the vector graphic;
processing the raster data to determine a set of dominant colours defined by the vector graphic; and
generating a set of file colour groups, wherein each file colour group is associated with a dominant colour of the set of dominant colours and with one or more file colours from the set of file colours, and wherein generating the set of file colour groups includes generating a first file colour group by:
selecting a first file colour of the set of file colours;
determining that the first file colour is closest to a first dominant colour of the set of dominant colours; and
associating the first file colour with the first dominant colour.

12. The computer processing system according to claim 11, wherein processing the raster data to determine the plurality of dominant colours defined by the vector graphic comprises:
processing the raster data to determine a plurality of colour clusters;
calculating a representative cluster colour for each colour cluster; and
determining each representative cluster colour to be a dominant colour.

13. The computer processing system according to claim 12, wherein calculating the representative cluster colour for a first colour cluster comprises calculating an average colour of all pixels associated with the first colour cluster.

14. The computer processing system according to claim 11, wherein determining that the first file colour is closest to the first dominant includes calculating distances between the first file colour and each dominant colour in the set of dominant colours.

15. The computer processing system according to claim 11, wherein the method further comprises:
determining a first representative group colour for the first file colour group; and
causing the first representative group colour to be displayed on a display.

16. The computer processing system according to claim 15, wherein determining the first representative group colour comprises calculating an average colour of all file colours associated with the first file colour group.

17. The computer processing system according to claim 11, wherein generating the set of file colour groups includes:
   selecting a second file colour of the set of file colours;
   determining that a distance between the second file colour and a closest dominant colour in the set of dominant colours exceeds a distance threshold; and
   not assigning the second file colour to any file colour group.

18. The computer processing system according to claim 11, wherein each file colour in the set of file colours is a fill colour and/or a stroke colour defined one or more of the vector graphic elements.

19. The computer processing system according to claim 11, wherein the method further comprises:
   receiving colour change input data identifying the first file colour group and a new colour; and
   in response to receiving the colour change input data:
      determining a colour transformation describing a change from a first representative group colour of the first file colour group to the new colour;
      for each file colour associated with the first file colour group, calculating a corresponding transformed file colour using the colour transformation;
      recolouring the vector graphic by replacing each file colour associated with the first file colour group with its corresponding transformed file colour; and
      causing the recoloured vector graphic to be displayed on a display.

20. A non-transitory computer-readable storage medium storing instructions, which when executed by a processing unit, cause the processing unit to perform a method comprising:
   processing a vector graphic to determine a set of file colours, wherein the vector graphic includes a plurality of vector graphic elements and each file colour in the set of file colours is a colour defined by one or more of the vector graphic elements;
   rasterising the vector graphic to generate raster data that defines a raster version of the vector graphic;
   processing the raster data to determine a set of dominant colours defined by the vector graphic; and
   generating a set of file colour groups, wherein each file colour group is associated with a dominant colour of the set of dominant colours and with one or more file colours from the set of file colours, and wherein generating the set of file colour groups includes generating a first file colour group by:
   selecting a first file colour of the set of file colours;
   determining that the first file colour is closest to a first dominant colour of the set of dominant colours; and
   associating the first file colour with the first dominant colour.

* * * * *